US009108109B2

(12) United States Patent
Pare et al.

(10) Patent No.: US 9,108,109 B2
(45) Date of Patent: Aug. 18, 2015

(54) METHOD FOR MANAGING THE DISPLAY OR DELETION OF A USER REPRESENTATION IN A VIRTUAL ENVIRONMENT

(75) Inventors: Louis Pare, Lannion (FR); Yves Scotto D'Apollonia, Thorigne Fouillard (FR)

(73) Assignee: ORANGE, Paris (FR)

( * ) Notice: Subject to any disclaimer, the term of this patent is extended or adjusted under 35 U.S.C. 154(b) by 466 days.

(21) Appl. No.: 12/808,068

(22) PCT Filed: Dec. 11, 2008

(86) PCT No.: PCT/FR2008/052276
§ 371 (c)(1),
(2), (4) Date: Jun. 14, 2010

(87) PCT Pub. No.: WO2009/080995
PCT Pub. Date: Jul. 2, 2009

(65) Prior Publication Data
US 2010/0293477 A1 Nov. 18, 2010

(30) Foreign Application Priority Data
Dec. 14, 2007 (FR) .................................... 07 59854

(51) Int. Cl.
*G06F 3/048* (2013.01)
*A63F 13/30* (2014.01)

(52) U.S. Cl.
CPC ......... *A63F 13/12* (2013.01); *A63F 2300/5553* (2013.01); *A63F 2300/5573* (2013.01); *A63F 2300/64* (2013.01); *A63F 2300/8082* (2013.01)

(58) Field of Classification Search
USPC ....................................................... 715/753
See application file for complete search history.

(56) References Cited

U.S. PATENT DOCUMENTS

| 5,736,982 A | * | 4/1998 | Suzuki et al. ................. 715/706 |
| 6,154,211 A | * | 11/2000 | Kamachi et al. .............. 345/419 |
| 6,217,446 B1 | | 4/2001 | Sanbongi et al. |

(Continued)

FOREIGN PATENT DOCUMENTS

EP 1010444 A1 6/2000

OTHER PUBLICATIONS

Animcating Groups of Socially Intelligent Agents, Published Cyberworlds, 2007. 8 pages.*

(Continued)

*Primary Examiner* — William Bashore
*Assistant Examiner* — Hien Duong
(74) *Attorney, Agent, or Firm* — David D. Brush; Westman, Champlin & Koehler, P.A.

(57) ABSTRACT

A method is provided for implementing and controlling virtual environments, for example "virtual worlds" by which users can for example meet one another virtually and communicate through their respective terminals. For example, the method relates to the display, rendering and/or deletion of the representations of users acting in these virtual environments, at the different terminals in which these representations can be viewed. The method includes the following steps for a given user: determination of a destination zone in the virtual environment in which the representation of the user is to be rendered; determination of an appearance zone in the virtual environment; displaying of the representation in the appearance zone; and automatic movement of the representation from the appearance zone to the destination zone.

14 Claims, 3 Drawing Sheets

(56) References Cited

U.S. PATENT DOCUMENTS

| | | | | |
|---|---|---|---|---|
| 6,396,509 B1* | 5/2002 | Cheng | | 715/706 |
| 6,559,870 B1* | 5/2003 | Anabuki et al. | | 715/849 |
| 7,181,690 B1* | 2/2007 | Leahy et al. | | 715/706 |
| 7,293,235 B1* | 11/2007 | Powers et al. | | 715/706 |
| 7,931,534 B2* | 4/2011 | Ishihata et al. | | 463/30 |
| 2002/0097267 A1* | 7/2002 | Dinan et al. | | 345/757 |
| 2003/0126128 A1* | 7/2003 | Watson | | 707/5 |
| 2006/0293103 A1* | 12/2006 | Mendelsohn | | 463/42 |
| 2007/0101276 A1* | 5/2007 | Yuen | | 715/757 |
| 2007/0288598 A1* | 12/2007 | Edeker et al. | | 709/217 |
| 2008/0098064 A1* | 4/2008 | Sherinian | | 709/203 |
| 2008/0252637 A1* | 10/2008 | Berndt et al. | | 345/419 |
| 2008/0268418 A1* | 10/2008 | Tashner et al. | | 434/365 |
| 2009/0113314 A1* | 4/2009 | Dawson et al. | | 715/757 |

OTHER PUBLICATIONS

French Search Report dated, Jul. 14, 2008 for corresponding French Application No. FR 0759854, filed Dec. 14, 2007.

Written Opinion dated Apr. 2007 for corresponding International Application No. PCT/FR2008/052276, filed Dec. 11, 2008.

International Search Report dated Jun. 4, 2009 for corresponding International Application No. PCT/FR2008/052276, filed Dec. 11, 2008.

\* cited by examiner

METHOD FOR MANAGING THE DISPLAY OR DELETION OF A USER REPRESENTATION IN A VIRTUAL ENVIRONMENT

CROSS-REFERENCE TO RELATED APPLICATIONS

This Application is a Section 371 National Stage Application of International Application No. PCT/FR2008/052276, filed Dec. 11, 2008 and published as WO 2009/080995 on Jul. 2, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the implementing and control of virtual environments, for example "virtual worlds" by which users can for example meet one another virtually and communicate through their respective terminals. More specifically, the disclosure pertains to the display, rendering and/or deletion of the representations of users acting in these virtual environments, at the different terminals in which these representations can be viewed.

Here below in this document, the expressions "virtual environment" or "virtual world" will be used equally without distinction, without in any way thereby affecting the understanding of the disclosure.

A virtual environment can be seen as a representation of a particular universe within which users of the real world are present in the form of avatars. An avatar is a user's representation defined by means of a set of parameters. A representation of this kind can take the form especially of an image or a moving object, taking on a human or fantastical appearance.

Thus, within a virtual environment known as an "immersive" environment, such a representation is generally on the basis of computations, sometimes complex ones, made on the basis of various parameters proper to a user. Such a representation may be a 2D or 3D representation and may function in real time both as a function of parameters and/or actions performed by the user in the virtual environment and as a function of actions performed by other users (or by their respective avatars) acting within a same virtual environment. A virtual environment is said to be "immersive" when the user is plunged into this environment by means of a representation of a space and of users, for example in three dimensions. The term used then is "user immersion".

BACKGROUND OF THE DISCLOSURE

In a virtual environment, meetings between avatars enable the users represented by these avatars to interact with one another.

In particular, a first user may wish to come into contact with a second user through their respective avatars. When the second user's avatar is not located in the vicinity of the first user's avatar, then the first user's avatar has to join the second user's avatar. For example, the first user's avatar should be able to meet the second user's avatar in a different region of the same virtual environment, or even in a distinct virtual environment.

To this end, certain systems propose a system of "virtual teleportation" by making the avatars disappear and then reappear at any place whatsoever in a destination virtual environment.

In other words, when two users decide to come together in the virtual world, or when one of the users decides to come close to a second user in order to perform common activities, for example to communicate, the representation of one of the users disappears and then joins the other user's representation and appears directly beside the other user's representation.

Thus, when the second user's terminal has received the needed information, the first user's avatar disappears from its original position and appears at one stroke beside the second user's avatar.

The other users having avatars present in the same region as the first user also note the sudden disappearance of this avatar on their respective screens and the other users having avatars present in the same region as the second user note the sudden appearance of the new avatar.

This technique of displaying avatars by an appearance or by deleting avatars by a disappearance is also implemented when a user' avatar comes into a virtual world or leaves a virtual world.

One drawback of this positioning technique is that it is not natural for the other users. Indeed, the other users will see an avatar appear or disappear suddenly on their respective terminals, which marks a break with reality and is not possible in real life.

Now, in order that the meetings in the virtual world may be close to reality, it is desirable that the avatars should behave naturally (especially in their motions and in their movements), enabling users to project themselves in the real world and provoking their desire to maintain the immersive situation.

Unfortunately, this classic positioning technique deletes the impression of immersion for the users who see avatars appear and disappear in a form of behavior not in keeping with reality. The utility of continuing the immersive experience then diminishes until it will ultimately cause a user to leave this virtual environment.

SUMMARY

An aspect of the present disclosure relates to a method for managing the display of a user's representation in this virtual environment wherein a plurality of user representations is acting.

According to an embodiment of the invention, a method of this kind implements the following steps for a given user:
  determining a destination area in the virtual environment to which the user's representation must go;
  determining an appearance area for the representation in the virtual environment;
  displaying the representation in the appearance area; and
  automatically moving the representation from the appearance area towards the destination area.

The term "area" is understood to mean especially one or more sets of coordinates, each defining a point of location in the virtual environment. In other words, an area may be a precise point in the virtual space or a region of proximity around a chosen point (for example, to adapt the exact point of appearance to requirements within this region).

Thus, an embodiment of the invention relies on a wholly novel and inventive approach to the management of the display of a user's representation, also called an avatar, in a virtual environment. This display corresponds to the sudden or gradual appearance of the avatar in the virtual environment.

Such a method may be implemented for example when a new user wishes to enter a virtual environment by means of his or her avatar or pass from a virtual environment to another virtual environment or else move within a same virtual environment.

It can be used especially to prevent behavior that is not natural in the impression of immersion felt by the users during the display of their respective avatars of a virtual world.

To this end, an embodiment of the invention proposes to cause the representation of the user to appear at a first place, called an appearance area, different from the place to which the user wants his representation to go. This step of displaying the representation in the appearance area enables a different rendering that is adapted to the terminals of the users present in the world.

Then, an embodiment of the invention provides for the automatic movement of this representation to a second place called a destination area.

Such a movement is automatically supported, i.e. without the user's intervention, for example by the user's terminal or by the entity for managing users' representations in the virtual environment.

According to one particular characteristic, the step of determining an appearance area selects an appearance area from amongst a group of at least one predefined appearance area in the virtual environment. In other words, in the virtual environment there may be one or more areas dedicated to the display of the avatars.

For example, let's consider an environment formed by three distinct regions, respectively representing a village, a forest beside the village and a beach beside the village. Each of these regions may have a predefined appearance area, for example corresponding to a perimeter round a statue at a central place in the village, around a big tree in the forest or around a restaurant on the edge of the beach.

Several areas of appearance may also be predefined in a same region of the virtual environment.

An appearance area may then be chosen from among several predefined areas so as to minimize the path to be followed during the automatic movement.

According to another aspect of an embodiment of the invention, the step of determining an appearance area selects an appearance area located outside the vision field of the representation of at least one other user in the virtual environment.

If we take up the previous example defining three regions each comprising at least one predefined area of appearance, a user's avatar may for example appear behind a statue or behind the big tree or else behind the restaurant. Thus, this user's avatar is concealed and does not enter the vision field of another user's avatar.

Preferably, the appearance area is located outside the fields of vision of all the users present in the virtual environment. However, if this is not possible (for example if there is a crowd of avatars in the forest), the appearance area is located outside the fields of vision of only some of the users present in the virtual environment. For example, it is possible not to take into account the vision field of avatars which are talking together and will not pay attention to the appearance of another avatar in their visual field.

In particular, the step of determining an appearance area comprises a preliminary step of storing positions and fields of vision of the representations of the other users in said virtual environment.

Thus, the appearance area is determined through a comparison of the fields of vision of the representations of one or more other users of the virtual environment and by the removal of those areas of the virtual field, from this comparison, that are not present in any of these fields of vision. It is then possible to select the appearance area closest to the destination area to which the first user's representation must go.

According to one particular characteristic of an embodiment of the invention, the step of determining a destination area implements:

obtaining location information regarding a second user's representation in the virtual environment;

deriving the destination area from the location information.

More specifically, according to this characteristic, the given user, also called the first user, is considered to be trying to come closer to a second user through their respective avatars. For example, this second user is chosen by the first user on the basis of the visual appearance of his avatar or on the basis of characteristics defined by this user.

The destination area is then determined for example by defining a contour relatively to one or more given referential systems, such as the location of the user's avatar that is to be met.

In particular, the automatic movement step comprises a preliminary step (and if necessary a repeated step) for updating the destination area.

Indeed, it is possible for the second user's avatar to be moving. In this case, the destination area can be updated according to a movement of the second user. This updating step can be implemented several times during the second user's movement, or only once when the second user stops at the end of his movement.

The destination area can also be updated if a third user's avatar appears in the vicinity of the second user's avatar. In this situation, the destination area is for example widened to include the third user's avatar.

According to another characteristic of an embodiment of the invention, the automatic movement step comprises a step of determining a path to be followed by the representation to reach the destination area.

This path makes it possible for example to comply with the environment, by following a pavement for example, or by avoiding fixed obstacles (such as trees, statues, panels, etc) or moving obstacles (such as the representations of the other users). It can therefore be necessary to re-update the computation of the path during the avatar's automatic movement step.

For example, this path is chosen so as to approach the destination area through one side of the second user's visual field.

In particular, the direction of exit from the appearance area takes into account the position and/or vision field of at least one other user.

For example, if the appearance area has a door between a store and the street, the first user's avatar will seem to come from the street and enter the store if the second user's avatar is in the store. On the contrary, if the second user's avatar is in the street, the first user's avatar will seem to come from the store and exit into the street.

According to another characteristic of an embodiment of the invention, the representation makes predetermined motions during the automatic movement step.

For example, the representation may make a hand gesture to greet the representations of the second and/or other users or it may come running with outstretched arms to meet the second user's avatar, etc.

Another embodiment pertains to a computer program product downloadable from a communications network and/or recorded on a computer-readable carrier and/or executable by a microprocessor, comprising program code instructions for executing the method for managing the display of a user's representation as described here above.

Another aspect of an embodiment of the invention concerns an entity for managing users' representations in at least one virtual environment, comprising:
- means for determining a destination area in one of the virtual environments to which a user's representation must go;
- means for determining an appearance area of the representation in the virtual environment;
- means for managing the display of the representation in the appearance area; and
- means for automatically moving the representation from the appearance area towards the destination area.

Such an entity is capable especially of implementing the method for managing described here above. It is for example a server managing representations of the users acting in a virtual environment.

Another aspect of an embodiment of the invention pertains to a user's terminal connected to an entity for managing users' representations in at least one virtual environment, comprising:
- means for managing the display of a user's representation in an appearance area in a virtual environment; determined by said managing entity;
- means for automatically moving said representation from said appearance area towards a destination area of said virtual environment, to which said representation must go.

Such a terminal may also comprise means for determining the destination area and means for determining the appearance area according to its capacities.

It is, for example, a computer, a telephone, a PDA or any other immersion terminal.

An embodiment of the invention also pertains to a method, which may supplement the previous one, for managing the deletion of a user's representation in a virtual environment in which a plurality of user representations is acting.

According to an embodiment of the invention, a method of this kind comprises the following steps for a given user:
- determining a disappearance area in the virtual environment;
- automatically moving the user's representation towards the disappearance area.
- deleting the representation when it is in said disappearance area.

Such a method for managing is implemented for example when a user wishes to leave a virtual environment by means of his or her avatar or pass from a virtual environment to another virtual environment or else move within a same virtual environment.

It can be used especially to prevent forms of behavior that are not natural in the impression of immersion in a virtual world during the deletion of the avatars occurring for example when a user is disconnected or during a movement from one region to another or from one virtual environment to another.

In particular, it may be recalled that an avatar deleted in one region of a virtual environment can be displayed in another region of the same environment or in a region of another virtual environment.

Again, the movement of the user's avatar is automatically supported, for example, by the user's terminal or by the entity for managing users' representations in the virtual environment.

In particular, the step of determining a disappearance area selects an area of disappearance from amongst a group of at least one predefined disappearance area in the virtual environment. These areas correspond for example to the previously mentioned areas of appearance.

According to another aspect of an embodiment of the invention, the step of determining a disappearance area selects a disappearance area located outside the vision field of the representation of at least one other user in the virtual environment.

In particular, this disappearance area can be updated according to the movements of the users.

The step of determining a disappearance area can also include a preliminary step of storing positions and fields of vision of the representations of the other users in the virtual environment.

As in the managing of a representation, the step of automatic movement during the deletion of a representation may comprise a step of determining a path to be followed by the representation to reach said destination area. Further, the representation may perform predetermined motions.

An embodiment of the invention also concerns a computer program product downloadable from a communications network and/or recorded on a computer-readable carrier and/or executable by a microprocessor, comprising program code instructions for executing the method for managing the display of a user's representation as described here above when said program is run on a computer.

Another aspect of an embodiment of the invention concerns an entity for managing users' representations in at least one virtual environment, comprising:
- means for determining a disappearance area in the virtual environment;
- means for automatically moving a user's representation towards the disappearance area;
- means for managing the deletion of a representation when the same is in said disappearance area.

Yet another aspect of an embodiment of the invention pertains to a user's terminal connected to an entity for managing users' representations in at least one virtual environment, comprising:
- means for automatically moving a user's representation towards a disappearance area, determined by said managing entity;
- means for managing the deletion of a representation when it is in said disappearance area.

BRIEF DESCRIPTION OF THE DRAWINGS

Other features and advantages shall appear more clearly from the following description of a particular embodiment given by way of a simple, illustrative and non-restrictive example and from the appended drawings, of which.

DETAILED DESCRIPTION OF ILLUSTRATIVE EMBODIMENTS

An embodiment of the invention proposes a novel approach to managing the display and/or the deletion of a user's representation in a virtual environment, by which this virtual representation (or avatar) can be made to appear or disappear naturally in a virtual environment, i.e. in a manner that is close to reality (in a real environment).

This approach can be implemented when the avatar representing a user arrives in the virtual world, moves in the virtual world, changes virtual worlds, or else leaves the virtual world.

Figure 1:
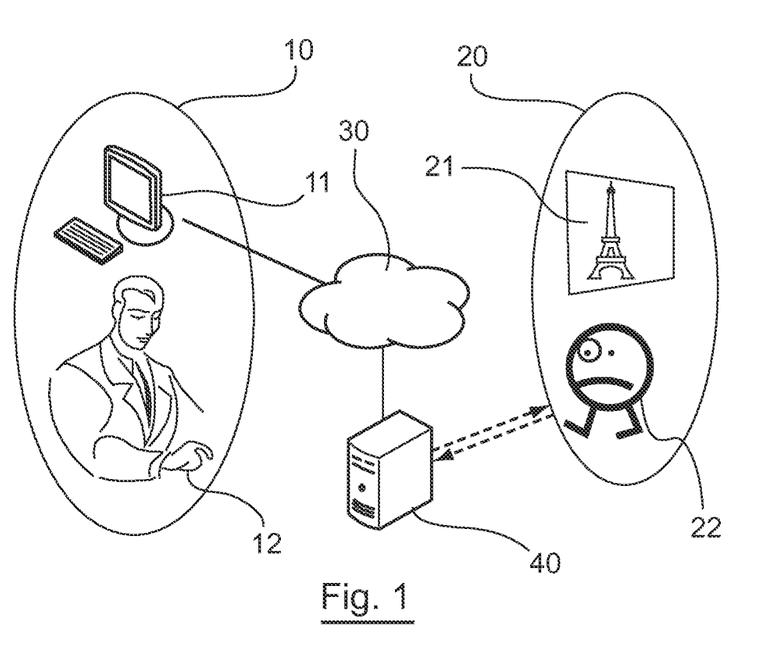
FIG. 1 illustrates an example of a general system for implementing the method of an embodiment of the invention.

FIG. 1 provides a more precise illustration of an example of a system in which this novel technique for managing the display/deletion of an avatar can be implemented.

In the real world 10, a user 12 can access a virtual world 20 by means of a user terminal 11 (a computer or any other immersion system, for example a telephone, a PDA, etc).

Each virtual world 20 comprises:
- one or more virtual spaces 21, representing for example a district, a town, a country, which may be existing or imaginary;
- users' representations or avatars, 22 representing users 12 from the real world.

Such a system also has:
- a communications network 30 enabling the immersion terminals 11 to communicate with one another as well as with servers 40;
- servers 40, or control or management entities installed on severs providing for a role of coordination, distribution and storage.

The user 12 of the real world 10 is represented by his avatar 22 in the virtual world 20. In the real world 10, the user 12 drives his representation 22 and sees the visual field perceived by this avatar 22 by means of the user terminal (also called an immersion terminal) 11.

More specifically, an embodiment of the invention seeks to make the appearance, movements and disappearance of avatars in the virtual world as natural as possible, i.e. close to what could effectively occur in reality, so that the users are identified with these avatars and appreciate their own immersion in this virtual world.

Indeed, in order that the meetings in the virtual world may be close to reality, for example in one application of a 3D encounter site, it is necessary for the motions and movements of the avatars to be natural especially when a first user's avatar decides to meet a second user's avatar so that they can get better acquainted.

Figure 2:
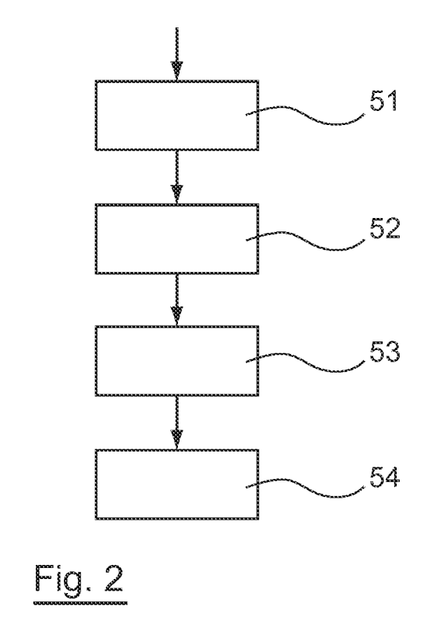
FIG. 2 presents the main steps of the method of display according to one embodiment of the invention.

FIG. 2 illustrates the main steps of the method for displaying a user's representation in a virtual environment in which a plurality of users' representations are moving and acting. Such a method can be implemented in many ways, especially in cabled form or in software form.

In a first step 51, for each given user also called a first user, a destination area is determined in the virtual environment to which the user's representation must go. The identification data items for this area are stored at least temporarily in a memory.

For example, this destination area corresponds to a meeting point with a second user's avatar or a place defined by default at the time of creation of the virtual environment (as such as the center of the village for example).

Then, in a second step 52, an appearance area in the virtual environment is determined. The appearance area is preferably located in the vicinity of the destination area. In particular, this area may be chosen from a group, comprising at least one predefined appearance area in a virtual environment. The pieces of identification data of the second area are also stored at least temporarily.

In a third step 53, the first user's representation is displayed in the appearance area. In particular, this display is visible in the first user's terminal but not necessarily visible on the other user terminals. Indeed, the appearance area may be located outside the vision field of the representations of the avatars of the other users in the virtual environment.

More specifically, a processing operation can be done in each user terminal to introduce, if necessary, the avatar concerned into the image rendered to the user, while taking into account the identification data items of the appearance area. According to another approach, this processing can be done by a server, or management entity, which then supplies the various terminals with the information needed to adapt the rendered images.

Finally, in a fourth step 54, the first user's representation is moved automatically, i.e. without any action on the part of the user, from the appearance area to the destination area.

During this step 54, a processing operation for computing and updating the coordinates of the avatar in motion is implemented as a function of the stored coordinates of the points of appearance and destination and, if necessary, some more information, as specified here below.

In particular, the steps for determining the destination area 51 and for determining the appearance area 52 can be implemented by a server or a managing entity such as the ones described with reference to FIG. 1. These steps can also be implemented by the terminal if its ability allows it. The steps of display 53 and movement 54, which are less costly in resources, can be implemented by the user's terminal.

Figure 3:
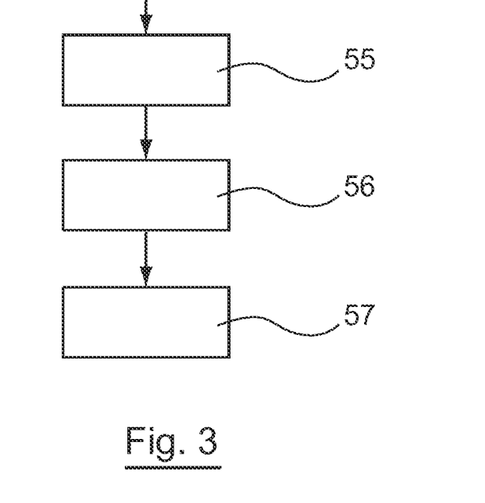
FIG. 3 presents the main steps of the method of deletion according to one embodiment of the invention.

FIG. 3 for its part illustrates the main steps of the method for deleting a user's representation in a virtual environment in which a plurality of representations of users is moving. Such a method can be implemented in various ways, especially in cabled or software form.

More specifically, during a first step 55, a disappearance area is determined in the virtual environment. This disappearance area is preferably proximate to the avatar. In particular, this area can be chosen from a group comprising at least one pre-defined disappearance area in the virtual environment.

In a second step 56, the user's representation is automatically moved, i.e. without any action by the user, from its original position to the disappearance area.

Finally, in a third step 57, the representation is deleted when it enters the disappearance area (or stays there for a certain time).

Figure 4:
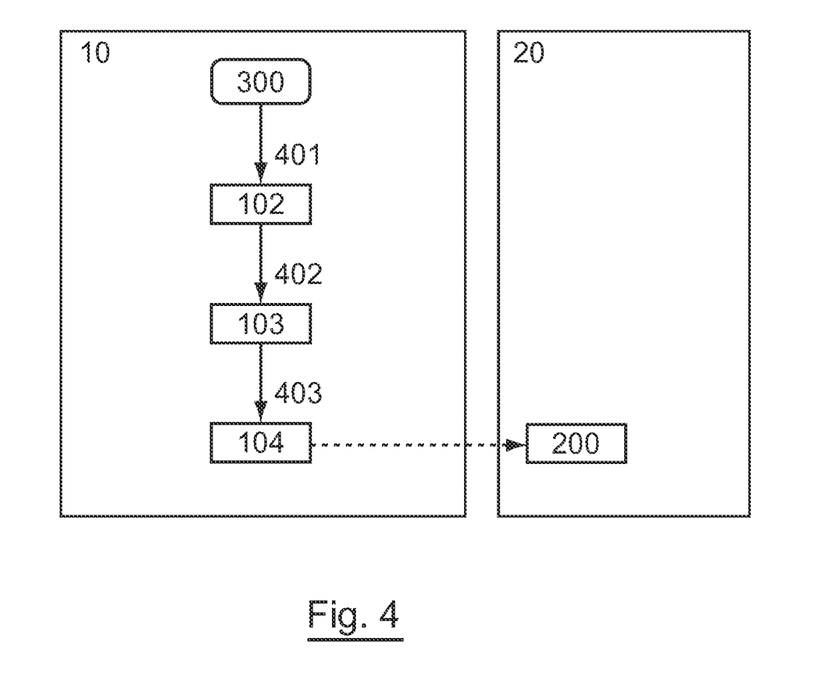
FIG. 4 illustrates a particular example of implementation of the method of display and deletion according to an embodiment of the invention in a system as illustrated in FIG. 1.

Referring now to FIG. 4, we present a particular example of implementation of the method for displaying or deleting according to an embodiment of the invention in a system as illustrated in FIG. 1.

It is considered to be the case for example that an avatar 200 can move, perform motions, communicate etc in the virtual world 20. This avatar 200 is driven by the user 12 in the real world 10.

In the real world 10, the reception, by terminal 11, of a new final position of an avatar, i.e. a new destination area, activates operations 102 for computing the initial positioning of the avatar in the new region or new environment and for deleting the avatar from the original region or environment.

According to this particular example, the computation operations 102 are used to determine an appearance area 402 (or disappearance respectively) proximate to the destination area (or current position of the avatar respectively), and located outside the fields of vision of the avatars present in the virtual world.

For determining this appearance area 402 (or disappearance), the terminal 11 of the user 12 takes into account information stored in a container 300. More specifically, this container 300, for example a file or a data base, stores the positions and fields of vision 401 of the avatars in the virtual world, at a given point in time. Thus, the appearance area (or disappearance) is determined by comparing the fields of vision of representations of one or more other users of the virtual environment, and by extracting from this comparison the areas of the virtual environment that are not present in any of these fields of vision.

If this is possible, the vision field of all avatars present in the world is taken into account.

If not, one can for example choose not to take into account the vision field of avatars who are talking with one another and will therefore not pay attention to the appearance (or disappearance) of another avatar in their vision field.

It is then possible to select the appearance area closest to the destination area in which the first user's representation must arrive or the disappearance area closest to the avatar's current location.

For example, the appearance area 402 is chosen from among the predefined areas of appearance (behind a tree, behind a statue, behind a restaurant, in the entrance area between a store and a street, etc) by computing the distance between each predefined appearance area and the destination area. The selected appearance area then corresponds to the predefined appearance area having the shortest distance from the destination area.

According to another example, for each avatar, an embodiment of the invention determines its axis of vision as being the intersection between two bisecting horizontal and vertical planes of his vision field 401 in the virtual environment 20.

From this axis of vision, and if we consider a 3D virtual environment 20, it is possible to determine the "half-space of non-vision" of an avatar 200 as being a half-space borne by the plane normal to this axis of vision that passes through the avatar's position 200 and does not contain this axis of vision (in other words, it is the half-space located behind the avatar). A possible appearance area is then located at the intersection of the two half-spaces of non-vision of all the avatars present in the virtual environment.

At a following step 103, the avatar 200 is displayed or "positioned" in this appearance area 402 of the virtual world. The avatar is at the same time deleted from the disappearance area.

To this end, movement commands 403 are transmitted to a driving interface 104 of the immersion terminal 11 in the real world 10 which translates these movement commands 403 into the virtual world 20 to move the avatar up to the desired final position.

More specifically, the driving interface 104 controls the motions of the avatar 200 in the real world 20.

For example, if the first user's avatar 200 moves in order to approach a second user's avatar, this avatar 200 can run towards the second user while stretching its arms out or making a hand gesture in order to display affection to it. If the avatar 200 wants to leave the scene, it can go away, waving goodbye.

The driving interface 104 also controls the movements of the avatar 200 in the virtual world 20. For example it determines a path to be followed by the representation to reach the destination area.

For example, this path is chosen so as to approach the destination area by one side of the visual field of the second user's avatar or else facing the avatar of this second user. In other words, it is possible to take into account the orientation of the second user's representation to determine the path to be followed to meet it. Thus, the first user's avatar can arrive before the second user's avatar or by one side and not from behind, thus optimizing a gradual and natural appearance of the first user's avatar in the vision field of the second user's avatar. Thus, this second user understands that the first user is trying to make contact with him.

In particular, the second user's avatar can keep moving while the first user's avatar 200 is trying to meet it. The destination area is then determined as a function of the location of the second user's avatar and updated as a function of the second user's movements. The first user's avatar can thus continue its movement until it succeeds in meeting the second user's avatar.

Figure 5:
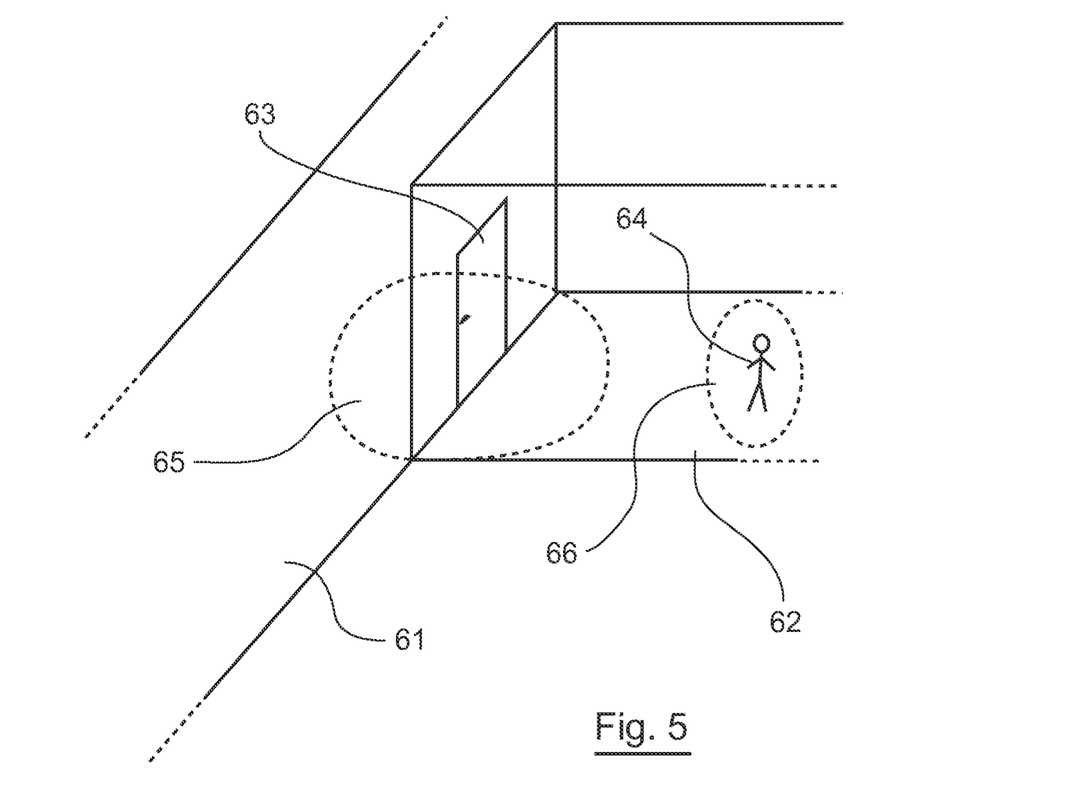
FIG. 5 illustrates an example of implementation of an embodiment of the invention, in a region of a virtual environment representing a street and a store.

FIG. 5 illustrates an example of implementation of an embodiment of the invention in a region of a virtual environment representing a street 61 and a store 62.

The avatar of a first user is deemed to be trying to make contact with a second user's avatar 64.

It is also considered to be the case that the avatar 64 is present in the store 62 and that the door 63 of the store is closed. Whatever the direction in which the avatar 64 is looking, its vision field is limited to the interior of the store (assuming that there are no windows or that there are lines on the windows).

Using a piece of location information regarding the avatar 64 in the virtual environment, the destination area 66 to which the first user's avatar must go in order to meet the second user's avatar 64 is determined. This destination area 66 defines a perimeter about the avatar 64 within the store 62. It could also correspond to the entire store 62.

An appearance area is then determined in which the first user's avatar could be displayed.

For example, the appearance area 65 is selected from a set of predefined areas of appearance in the virtual environment. It can be noted that the portion of the appearance area 65 located on the road 61 side is outside the field of view of the avatar 64.

The first user's avatar can therefore appear in the portion of the appearance area 65 located on the road 61 side, then cross the door 63 and then enter the store 62 and meet the avatar 64.

Conversely, if the second user's avatar 64 is located in the street 61, then the destination area corresponds to a portion of the street 61 that is proximate to the avatar 64.

The first user's avatar can then appear in the portion of the appearance area 65 located one the store 62 side, then go through the door 63 and come out of the store 62 and meet the avatar 64 in the street 61.

In other words, the direction of exit from the appearance area takes into account the position and/or the vision field of the avatar of at least one other user.

Figure 6:
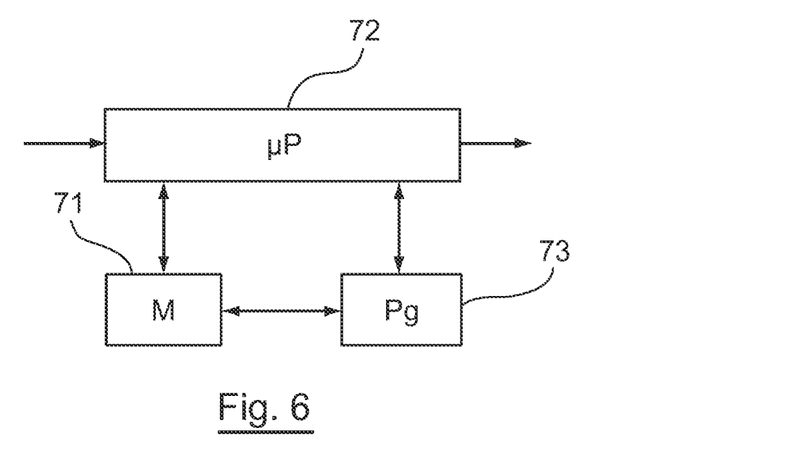
FIG. 6 presents the structure of a device for managing the display and/or the deletion of a user's representation according to one particular embodiment of the invention.

Referring now to FIG. 6, the simplified structure of a device for managing the display and/or deletion of a user's representation, according to one particular embodiment of the invention, is presented.

More specifically, it may be recalled that an avatar deleted in one region of a virtual environment can be displayed in another region of the same environment or in a region of another virtual environment. Consequently, a same device can manage both the display, i.e. the appearance, of an avatar in a new region and the deletion, i.e. the disappearance, of the avatar from its original region.

This device may for example be an entity for managing user representations in at least one virtual environment or a user's terminal.

Such a device comprises a memory 71 constituted by a buffer memory, a processing unit 72 equipped for example with a microprocessor µP and driven by a computer program 73 implementing the method for displaying and/or deleting an embodiment of according to the invention.

At initialization, the code instructions of the computer program 73 are loaded for example into a RAM and then executed by the processor of the processing unit 72. At an input, the processing unit 72 receives information items representing a current location of a representation of the user and, if the avatar must move in the world, of an area to which the user's representation must go.

The microprocessor of the processing unit 72 implements the above-described steps of the method for displaying or deleting, according to the instructions of the computer program 73 for determining an appearance area, a destination area and for automatically moving the avatar towards this area, or for determining a disappearance area and for automatically moving the avatar from its original position towards this area. To this end, the device for managing the display and/or the deletion comprises, in addition to the buffer memory 71:

means for determining a destination area in one of the virtual environments; means for determining an appearance area in the virtual environment; means for managing the displaying of the representation in the appearance area; and means for automatically moving the representation from the appearance area towards the destination area; and/or means for determining a disappearance area in the virtual environment; means for automatically moving a user's representation towards the disappearance area; means for managing the deletion of a representation when the same is in the disappearance area.

These means are driven by the microprocessor of the processor unit 72.

Although the present disclosure has been described with reference to one or more examples, workers skilled in the art will recognize that changes may be made in form and detail without departing from the scope of the disclosure and/or the appended claims.

The invention claimed is:

1. A method for managing a display of a representation of a given user of the real world in a virtual environment wherein a plurality of representations of users of the real world is acting, and wherein the method comprises, for the given user, the following successive steps performed by at least one processing device:

determining first a destination area in a virtual space of the virtual environment to which the given user's representation must go, based on an input provided to the at least one processing device by the given user, wherein the given user's representation is not currently displayed in the virtual space;

then determining an appearance area for initiating a display of said given user's representation in said virtual space, which is different than said destination area, wherein determining an appearance area selects an appearance area located outside a vision field of the representation of at least one other user of the plurality of users in the virtual space, by taking account of the vision field;

then displaying said given user's representation in said appearance area; and then, without the given user's intervention, automatically moving said given user's representation from the appearance area outside the vision field along a path towards the destination area and into the vision field such that the user's representation has a natural appearance into the vision field of the representation of said at least one other user.

2. The method according to claim 1, wherein determining an appearance area selects an appearance area from amongst a group of at least one predefined appearance area in said virtual environment.

3. The method according to claim 1, wherein determining an appearance area comprises a preliminary step of storing positions and vision fields of the representations of said other users in said virtual environment.

4. The method according to claim 1, wherein determining a destination area implements:

obtaining location information regarding a second user's representation in said virtual environment; and deriving said destination area from said location information.

5. The method according to claim 1, wherein automatically moving comprises a preliminary step of updating the destination area.

6. The method according to claim 1, wherein automatically moving comprises determining a path to be followed by said given user's representation to reach said destination area.

7. The method according to claim 6, wherein said path defines an exit direction from said appearance area, by taking into account at least one of a position or vision field of a representation of at least one other user in said virtual environment.

8. The method according to claim 6, wherein said path is chosen so as to approach said destination area by a side of a visual field of the representation of a second user in said virtual environment.

9. The method according to claim 6, wherein said path is chosen so as to approach said destination area by a side of a visual field of the representation of said second user in said virtual environment.

10. The method according to claim 1, wherein, during said step of automatically moving, said given user's representation makes predetermined motions.

11. A method for managing deletion of a representation of a given user of the real world in a virtual environment in which a plurality of representations of users of the real world is acting, wherein the method comprises, for the given user, the following successive steps performed by at least one processing device:

based on an input provided to the at least one processing device by the given user, determining first a disappearance area in the virtual environment, which is different from an original position of the representation within the virtual environment in which the given user's representation is currently displayed inside a vision field of the representation of at least one other user of the plurality of users in the virtual environment, wherein determining a first disappearance area selects a disappearance area located outside the vision field of the representation of said at least one other user, by taking account of the vision field;

then, without the given user's intervention, automatically moving the given user's representation from the original position inside the vision field along a path towards the disappearance area outside the vision field such that the user's representation has a natural disappearance from the vision field of the representation of said at least one other user; and then deleting said given user's representation from the virtual environment when said given user's representation is in said disappearance area.

12. A non-transitory computer-readable memory comprising a computer program product recorded thereon and executable by a microprocessor, wherein the product comprises program code instructions for configuring the microprocessor to execute a method for managing a display of a representation of a given user of the real world in a virtual environment wherein a plurality of representations of users of the real world is acting, when said program is run on a computer, wherein the method the method comprises, for the given user, the following successive steps performed by the microprocessor:

determining first a destination area in a virtual space of the virtual environment to which the given user's representation must go, based on an input provided to the at least one processing device by the given user, wherein the given user's representation is not currently displayed in the virtual space;

then determining an appearance area for initiating a display of said given user's representation in said virtual space, which is different than said destination area, wherein determining an appearance area selects an appearance area located outside a vision field of the representation of at least one other user of the plurality of users in the virtual space, by taking account of the vision field;

then displaying said given user's representation in said appearance area; and then, without the given user's intervention, automatically moving said given user's representation from the appearance area outside the vision field along a path towards the destination area and into the vision field such that the user's representation has a natural appearance into the vision field of the representation of said at least one other user.

13. An entity for managing representations of a plurality of users of the real world in at least one virtual environment, wherein the entity comprises:

means for determining first a destination area in a virtual space of one of said virtual environments to which a given user's representation must go based on an input provided to the entity by the given user-wherein the given user's representation is not currently displayed in the virtual space;

means for then determining an appearance area for initiating a display of said given user's representation in said virtual space, which is different than said destination area, wherein determining an appearance area selects an appearance area located outside a vision field of the representation of at least one other user of the plurality of users in the virtual space, by taking account of the vision field;

means for then managing initiation of the display of said given user's representation in said appearance area; and means for then automatically moving said given user's representation, without the given user's intervention, from said appearance area outside the vision field along a path to said destination area and into the vision field such that the user's representation has a natural appearance into the vision field of the representation of said at least one other user.

14. A terminal of a given user of the real world, which is connected to a managing entity for managing representations of a plurality of users of the real world in at least one virtual environment, wherein the terminal comprises:

means for managing a display of the given user's representation in an appearance area in a virtual space of a virtual environment; the appearance area being determined by said managing entity based on an input provided by the given user and by taking account of a vision field of the representation of at least one other user of the plurality of users in the virtual space, wherein the given user's representation is not currently displayed in the virtual space; and means for initiating a display of said given user's representation in said appearance area of said virtual space, which is different than a destination area in the virtual space to which the given user's representation must go and is located outside the vision field of the representation of the at least one other user of the plurality of users in the virtual space, and for then automatically moving said given user's representation, without the given user's intervention from said appearance area outside the vision field along a path towards said destination area and into the vision field such that the user's representation has a natural appearance into the vision field of the representation of said at least one other user.

* * * * *